April 11, 1933.                N. SKILLMAN                1,903,483
                              SHAFT MOUNTING
                            Filed Aug. 2, 1926
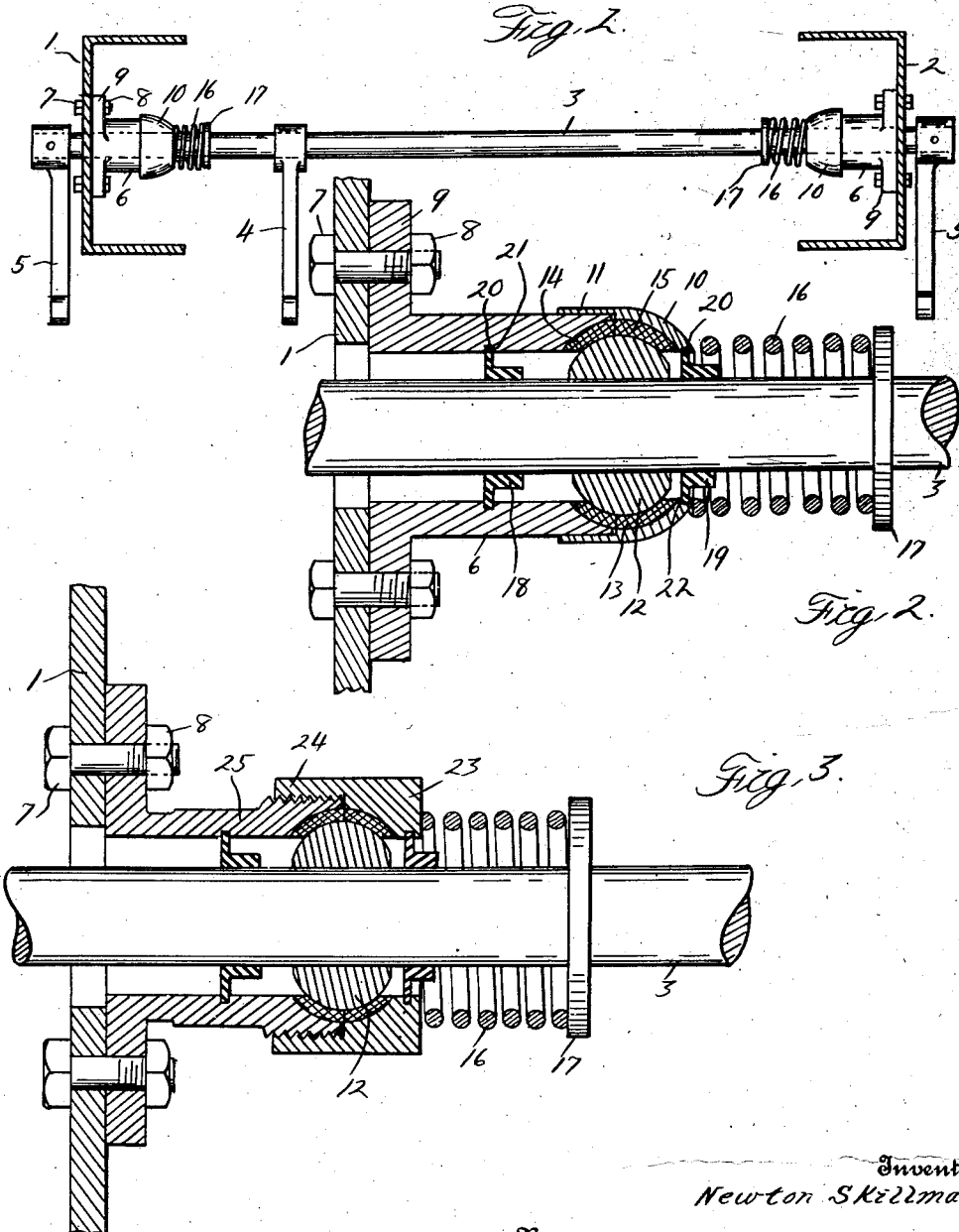
Inventor
Newton Skillman Patented Apr. 11, 1933

1,903,483

UNITED STATES PATENT OFFICE

NEWTON SKILLMAN, OF HIGHLAND PARK, MICHIGAN, ASSIGNOR TO O. & S. BEARING CO., OF DETROIT, MICHIGAN, A CORPORATION OF MICHIGAN

SHAFT MOUNTING

Application filed August 2, 1926. Serial No. 126,522.

The invention relates to shaft mountings and refers particularly to mountings for rotatable cross shafts of motor vehicles. In present day quantity production of motor vehicles manufacturing inaccuracies occur in locating the bearings upon chassis frames for the oscillatory cross brake shafts and as a consequence it is rather common for the assemblers to bend these cross shafts so that they may be assembled in their bearings and to then depend upon a loose fit between the bearings and the cross shafts for permitting oscillation of the cross shafts.

With my invention the manufacturing inaccuracies may be permitted and at the same time the bearings for the cross shafts properly fit and the oscillation of the cross shafts is not interfered with. Other objects are to provide self-aligning and self-lubricating mountings; to provide mountings having non-metallic contact between the relatively movable parts; to provide mountings in which the contacting surfaces are sealed from dirt, water, etc.; and to provide means in the mountings for automatically taking up wear. Further objects of the invention reside in the novel features of construction and combinations and arrangements of parts as more fully hereinafter set forth.

In the drawing:—

Figure 1 is a cross section through a motor vehicle chassis frame, showing the method of mounting an oscillatory cross brake shaft;

Figure 2 is an enlarged section of a portion thereof;

Figure 3 is a view similar to Figure 2 showing a modified construction of mounting.

The chassis frame of the motor vehicle has the side sills 1 and 2 which, as shown, are channel-shaped. The webs of these side sills are apertured for the passage of the oscillatory cross brake shaft 3 which has secured thereto intermediate the side sills the arm 4 for connection to the brake pedal. This shaft also may have secured to its ends and outside the side sills the arm 5 for connection to the front wheel brake shoes. Since the apertures in the side sills may be misaligned owing to manufacturing inaccuracies, I have provided means for mounting the shaft so that it may properly oscillate and at the same time the bearings properly fit.

The means for mounting the shaft comprises a mounting at each end of the shaft. Since the mountings are alike, but one will be described. In detail, 6 is the supporting base of the mounting in the nature of a bracket secured to the inner side of the web of a side sill as by means of the bolts 7 and the nuts 8, the former extending through the web of the side sill and the flanges 9 upon the base. 10 is a cap at the end of the base 6 and having the cylindrical flange 11 telescopically engageable over the base. The base is preferably a casting while the cap is preferably a sheet metal stamping and both have registering apertures therethrough which also register with the aperture in the web of the side sill, these apertures having a diameter appreciably greater than that of the shaft 3 to permit passage of this shaft freely therethrough and allow angular movement of the shaft relative thereto. 12 is a frusto-spherical member fixed upon the shaft 3 as by means of a suitable set screw, key or other means (not shown). 13 is a compressed lubricant impregnated bushing of fibrous material formed of the complementary sections 14 and 15 respectively fixedly mounted in the base 6 and cap 10 and together forming a frusto-spherical self-lubricating bearing surface for engagement with the frusto-spherical member 12. These bearing sections are compressed into the base and cap to form their bearing faces so that they will conform to and properly fit the bearing face of the frusto-spherical member. The faces of the base and cap engageable with the bearing sections are rough so that the bearing sections are fixedly secured in the base and cap. With this construction of mounting at each end of the shaft 3 it will be seen that the apertures in the side sills may be inaccurately located but the shaft may be readily assembled and when assembled may be freely oscillated owing to the fact that the mountings are self-aligning and self-lubricating.

For the purpose of taking up the wear the cap 10 of each mounting is yieldably forced toward its base 6 as by means of the coil spring 16 surrounding the shaft 3 and abutting the cap and the collar 17 which latter is fixed upon the shaft by a cotter pin or similar means (not shown) and spaced longitudinally from the cap. This spring is sufficiently strong to hold the bearing section 15 firmly against the frusto-spherical member 12.

To seal the contacting surfaces from dust, water, etc., I have mounted upon the shaft 3 the gussets 18 and 19 which are preferably formed of soft rubber and have annular flanges 20. The gusset 18 is located within the base 6 and its annular flange engages in the internal annular groove 21 in this base, while the gusset 19 is located so that its annular flange engages in the internal annular groove 22 in the cap 10. These gussets are forced upon the shaft and being yieldable permit of the necessary angular location of the shaft relative to the mounting and at the same time form good seals.

The mounting shown in Figure 3 is formed in the same general manner as that shown in Figures 1 and 2 with the exception that the cap 23 has its cylindrical flange 24 internally threaded to engage external threads upon the supporting base 25. Instead of depending upon a yieldable pressure for forcing the cap toward the base to take care of wear, the cap is manually adjusted toward the base by screwing the same thereupon.

What I claim as my invention is:

1. The combination with a rotatable shaft, of a mounting for said shaft comprising a supporting base and cap having complemental spherical surfaces, a frusto-spherical member fixed upon said shaft and universally movable relative to said base and cap, an initially compressed and shaped lubricant impregnated bushing of fibrous material comprising cooperating annular sections respectively compressed into and rigidly mounted in said base and cap and together forming a frusto-spherical bearing surface for direct engagement with said frusto-spherical member, an abutment upon said shaft and a coil spring between said abutment and cap for yieldably forcing said cap toward said base.

2. The combination with a chassis frame having apertured side sills and an oscillatory brake cross shaft extending through the apertures of said side sills, of means for mounting said shaft to permit of the misalignment of the apertures in said cross sills, said means comprising mountings carried by said frame and spaced longitudinally of said shaft, each of said mountings comprising an integral support and annular base member and an annular cap through which said shaft extends, a frusto-spherical member fixed upon said shaft and located within said base and cap, a compressed lubricant impregnated bushing comprising preformed annular and spherical cooperating sections respectively compressed into and rigidly carried by said base and cap and together forming frusto-spherical bearing surfaces for engagement with said frusto-spherical member.

3. A self-aligning, self-lubricating bearing, comprising an inner bearing member having a substantially spherical bearing surface, a bushing consisting of lubricant impregnated fibrous material positioned around the spherical surfaces of said inner bearing member, and an outer bearing member formed in two parts, one of said parts being shaped to form a portion of the bearing member and a support attaching part, and the other part being formed of a stamped sheet metal portion, said bushing of fibrous material being compressed into the inner surfaces of the two parts forming the outer bearing member and being preformed to complementally fit the spherical bearing surface of the inner bearing and to be fixably secured to the inner faces of the outer bearing member, said two parts of the outer bearing member being complementally fitted together to lock the inner bearing member in position, and means for maintaining the surfaces of the preformed bushing in contact with the inner bearing.

4. A self-aligning, self-lubricating bearing, comprising an inner bearing member having a substantially spherical bearing surface, a bushing consisting of lubricant impregnated fibrous material positioned around the spherical surfaces of said inner bearing member, and an outer bearing member formed in two parts, one of said parts being shaped to form a portion of the bearing member and a support attaching part, and the other part being formed of a stamped sheet metal portion, said bushing of fibrous material being compressed into the inner surfaces of the two parts forming the outer bearing member and being preformed to complementally fit the spherical bearing surface of the inner bearing and to be fixably secured to the inner faces of the outer bearing member, said two parts of the outer bearing member being complementally fitted together to lock the inner bearing member in position, and means for maintaining the surfaces of the preformed bushing in contact with the inner bearing, the inner faces of the two parts forming the outer bearing member being rough to assist in fixably securing the compressed preformed bushing directly to said roughened surfaces.

5. A self-aligning, self-lubricating bearing comprising an inner bearing member having a substantially spherical bearing surface, two annular strips of lubricant impregnated material annularly positioned around the bearing surface of said inner bearing member, and a second bearing member consisting of two annular parts, one part forming a portion of the bearing member and attaching support, and the other part terminating in an aperture of less diameter than said inner bearing member, said parts complementally fitting together to lock said inner bearing member in position, said annular strips of lubricant impregnated material being compressed into the inner surfaces of said two parts so as to be fixably secured to and carried by said two parts, said annular strips of lubricant impregnated material being preformed to provide spherical bearing surfaces for contacting with the spherical bearing surface of the inner member.

6. A self-aligning, self-lubricating bearing comprising an inner bearing member having a substantially spherical bearing surface, two annular strips of lubricant impregnated material annularly positioned around the bearing surface of said inner bearing member, and a second bearing consisting of two annular parts, one part forming a portion of the bearing member and attaching support and the other part terminating in an aperture of less diameter than said inner bearing member, said parts complementally fitting together to lock said inner bearing member in position, said annular strips of lubricant impregnated material being compressed into the inner surfaces of said two parts so as to be fixably secured to and carried by said two parts, said annular strips of lubricant impregnated material being preformed to provide spherical bearing surfaces for contacting with the spherical bearing surface of the inner member, one of said parts being threaded whereby said two parts with their fixed linings of bushing material may be screwed together to lock the inner bearing member in position.

7. A self-aligning, self-lubricating bearing, comprising an inner bearing member having a substantially spherical bearing surface, a layer of lubricant impregnated fibrous material annularly positioned around said member, and an outer bearing member formed in two annular halves, one of said halves forming a support for the bearing and also being provided with a semi-spherical inner bearing surface, the other half also having a semi-spherical inner bearing surface and having a flange cooperating with the other half so that the two halves when fitted together form a substantially spherical inner wall, said strip of lubricant impregnated material being formed in two parts and being compressed into said semi-spherical walls of said two annular parts so as to rigidly adhere to said walls and form a part of the outer bearing member, said two annular strips of lubricant impregnated material being preformed to provide a substantially spherical bearing surface cooperating with and contacting with the substantially spherical bearing surface of the inner member, one of said outer bearing halves being provided with an aperture, of less diameter than said inner bearing member, for receiving an actuating member for said inner bearing member.

In testimony whereof I affix my signature.

NEWTON SKILLMAN.